(12) United States Patent
Sakamoto et al.

(10) Patent No.: US 12,116,147 B2
(45) Date of Patent: Oct. 15, 2024

(54) SAMPLING METHOD AND SAMPLING SYSTEM

(71) Applicant: KAWASAKI JUKOGYO KABUSHIKI KAISHA, Kobe (JP)

(72) Inventors: Fuminobu Sakamoto, Kakamigahara (JP); Toyotoshi Kurose, Seki (JP)

(73) Assignee: KAWASAKI JUKOGYO KABUSHIKI KAISHA, Kobe (JP)

(*) Notice: Subject to any disclaimer, the term of this patent is extended or adjusted under 35 U.S.C. 154(b) by 0 days.

(21) Appl. No.: 18/378,410

(22) Filed: Oct. 10, 2023

(65) Prior Publication Data
US 2024/0034486 A1 Feb. 1, 2024

Related U.S. Application Data

(60) Division of application No. 17/092,422, filed on Nov. 9, 2020, now Pat. No. 11,926,440, which is a
(Continued)

(51) Int. Cl.
*B64G 1/00* (2006.01)
*B64G 1/10* (2006.01)
(Continued)

(52) U.S. Cl.
CPC .............. *B64G 1/105* (2013.01); *B64G 1/16* (2013.01); *B64G 1/222* (2013.01); *B64G 1/2427* (2023.08);
(Continued)

(58) Field of Classification Search
CPC .......... B64G 1/105; B64G 1/16; B64G 1/222; B64G 1/2427; B64G 1/36; B64G 1/1071;
(Continued)

(56) References Cited

U.S. PATENT DOCUMENTS

| 9,233,470 B1 | 1/2016 | Bradski et al. |
| 2002/0060783 A1 | 5/2002 | Aoyama |

(Continued)

FOREIGN PATENT DOCUMENTS

| EP | 2977719 A1 | 1/2016 |
| JP | H09-301300 A | 11/1997 |

(Continued)

OTHER PUBLICATIONS

Jan. 3, 2024 Notice of Allowance issued in U.S. Appl. No. 17/092,422.

*Primary Examiner* — Adam R Mott
*Assistant Examiner* — Sagar Kc
(74) *Attorney, Agent, or Firm* — Oliff PLC (57) ABSTRACT

A sampling system includes a sampler, a projector, a camera, an arm, and a controller with the sampler, projector, and camera being located at the distal end of the arm. The projector projects a reference mark including a line with a predetermined shape onto a ground surface and the camera captures images of the projected mark. The controller is configured to obtain the size of the projected line based on the camera images. The controller adjusts the projector height position based on the line size and specifies a sampling point for inserting the sampler based on the camera images of the projected mark.

5 Claims, 6 Drawing Sheets

Related U.S. Application Data continuation of application No. PCT/JP2019/018356, filed on May 8, 2019.

(60) Provisional application No. 62/668,989, filed on May 9, 2018.

(51) Int. Cl.
| | |
|---|---|
| *B64G 1/16* | (2006.01) |
| *B64G 1/22* | (2006.01) |
| *B64G 1/24* | (2006.01) |
| *B64G 1/36* | (2006.01) |
| *G06T 7/73* | (2017.01) |
| *G06V 10/22* | (2022.01) |
| *G06V 10/24* | (2022.01) |
| *G06V 20/10* | (2022.01) |
| *G06V 20/64* | (2022.01) |

(52) U.S. Cl.
CPC ................. *B64G 1/36* (2013.01); *G06T 7/74* (2017.01); *G06V 10/22* (2022.01); *G06V 10/245* (2022.01); *G06V 20/10* (2022.01); *G06V 20/64* (2022.01); *B64G 1/1071* (2023.08); *G06T 2207/30204* (2013.01); *G06T 2207/30248* (2013.01)

(58) Field of Classification Search
CPC .. B64G 99/00; B64G 4/00; B64G 1/66; G06T 7/74; G06T 2207/30204; G06T 2207/30248; G06T 2207/30261; G06V 10/22; G06V 10/245; G06V 20/10; G06V 20/64

See application file for complete search history.

(56) References Cited

U.S. PATENT DOCUMENTS

| | | | |
|---|---|---|---|
| 2003/0208303 A1* | 11/2003 | Okamoto | B25J 17/025 700/245 |
| 2007/0030486 A1 | 2/2007 | Gelbart | |
| 2010/0135534 A1 | 6/2010 | Weston et al. | |
| 2010/0142798 A1* | 6/2010 | Weston | G01B 11/026 382/141 |
| 2016/0084642 A1* | 3/2016 | Bradski | B25J 9/1612 348/136 |
| 2016/0245641 A1* | 8/2016 | Kowdle | G01B 11/026 |
| 2016/0288330 A1 | 10/2016 | Konolige | |
| 2016/0378117 A1* | 12/2016 | Szatmary | G06V 10/145 382/153 |
| 2018/0024521 A1* | 1/2018 | Matsuura | B25J 9/1692 700/83 |

FOREIGN PATENT DOCUMENTS

| | | |
|---|---|---|
| JP | 2003-326478 A | 11/2003 |
| JP | 2010-537183 A | 12/2010 |

\* cited by examiner

SAMPLING METHOD AND SAMPLING SYSTEM

This application is a divisional application of U.S. patent application Ser. No. 17/092,422 filed Nov. 9, 2020, which is a continuation of International Application No. PCT/JP2019/018356, filed May 8, 2019, which claims the benefit of U.S. Patent Application No. 62/668,989, filed May 9, 2018. The disclosure of the prior applications is hereby incorporated by reference herein in their entirety.

TECHNICAL FIELD

The present application relates to a sampling method of and a sampling system for performing sampling on a ground surface.

BACKGROUND ART

In a case where a work machine, such as an exploration probe, performs sampling on a ground surface, it is necessary to specify a sampling point first. Desirably, the sampling point is a flat surface without obstacles, such as rocks and stones. At the time of specifying the sampling point, if there is a relatively large obstacle, the obstacle can be detected by a sensor (including a camera) provided on the work machine.

However, the detection precision of the sensor provided on the work machine is not high due to its wide detection range. Therefore, the sensor is not suitable for detecting small obstacles, such as small stones. If the detection precision of the sensor is set high, the sensor will be able to detect small obstacles. In this case, however, if the detection precision of the sensor is set high while still keeping its wide detection range, then the processing time will be lengthy, and the sampling cannot be performed speedily.

SUMMARY

A sampling method according to one aspect of the present application includes: obtaining topographical information about a predetermined wide area by using a first sensor provided on a work machine; selecting a candidate area within the wide area based on the topographical information about the wide area, the candidate area having an area less than an area of the wide area, and setting a movement route based on the topographical information about the wide area, the movement route being a route that allows a distal end portion of an arm provided on the work machine to reach a preparation position without coming into contact with an obstacle, the preparation position facing the candidate area; moving the distal end portion of the arm along the movement route to the preparation position, and thereafter obtaining topographical information about the candidate area by using a second sensor provided on the distal end portion of the arm; and specifying a sampling point based on the topographical information about the candidate area and performing sampling at the specified sampling point.

In addition, in the above sampling method, the movement route, which does not cause the distal end portion of the arm to come into contact with the obstacle, is set based on the topographical information about the wide area, and the distal end portion of the arm is moved along the movement route.

In the above sampling method, the second sensor may include a projector configured to project a predetermined reference mark, and obtaining the topographical information about the candidate area may include: projecting the reference mark onto the candidate area; and obtaining the topographical information about the candidate area based on a shape of the reference mark that is displayed on the candidate area by projection.

The above sampling method may include projecting the reference mark from the projector in an advancing direction of the distal end portion of the arm when moving the distal end portion of the arm to the preparation position, determining whether or not there is an obstacle on the movement route based on presence or absence of a display of the reference mark by projection or based on a shape and a size of the reference mark displayed by projection, and if it is determined that there is an obstacle on the movement route, moving the distal end portion of the arm to the preparation position in a manner to avoid the obstacle.

A sampling system according to one aspect of the present application includes: a sampler for bringing back a sample of a ground surface; a projector configured to project a reference mark onto the ground surface, the reference mark including a line that has a predetermined shape; a camera configured to capture an image of the reference mark that is displayed on the ground surface by projection; an arm whose distal end portion is provided with the sampler, the projector, and the camera; and a controller configured to: obtain a size of the line that is displayed on the ground surface by projection, based on image data of the reference mark captured by the camera; adjust a height position of the projector based on the obtained size of the line; and thereafter specify a sampling point, into which the sampler is thrown and inserted, based on the image data of the reference mark captured by the camera.

According to this configuration, the sampling point, into which the sampler is thrown and inserted, is specified by capturing an image of the reference mark projected onto the ground surface. Accordingly, inspection of the ground surface can be performed speedily, and also, the sampling can be performed in a manner to avoid small stones or the like. Therefore, the above configuration is particularly useful in a case where the presence of small stones or the like would hinder the sampling, for example, a case where the sampler is inserted into the ground surface or a case where the use of a gear type sampler is adopted.

In the above sampling system, the sampler may have a cylindrical shape. The reference mark may include a circular line. The controller may be configured to: obtain a diameter of the circular line that is displayed on the ground surface by projection, based on the image data of the reference mark captured by the camera; adjust a height position of the projector by driving the arm, such that the obtained diameter of the circular line coincides with a diameter of the sampler; and thereafter specify the sampling point, into which the sampler is thrown and inserted, based on the image data of the reference mark captured by the camera.

According to this configuration, the circular line, the shape of which is the same as the cross-sectional shape of the sampler, is projected onto the ground surface, and the diameter of the circular line displayed on the ground surface by projection is made coincide with the diameter of the sampler. Then, the sampling point is specified by utilizing the circular line displayed on the ground surface by projection. That is, the sampling point can be specified by the detection that covers only the range corresponding to the shape and the size of the sampler.

In the above sampling system, the reference mark may include one or two straight lines passing through a center of the circular line, each straight line having both end portions crossing the circular line.

Here, when measuring the diameter of the circular line, there is a case where it is not clear which two points on the circular line should be used to measure an inter-point distance therebetween to obtain the diameter of the circular line. In this respect, in the above configuration, the diameter of the circular line can be obtained by measuring the distance between the intersection points of the straight line and the circular line. Therefore, the diameter of the circular line can be accurately and readily obtained. Moreover, since the straight line passes through the inside of the circular line, irregularities of the ground surface can be detected also inside the circular line.

In the above sampling system, the reference mark may include a smaller-diameter circular line inside the circular line, the smaller-diameter circular line having a diameter less than the diameter of the circular line.

According to this configuration, since the smaller-diameter circular line is positioned inside the circular line, irregularities of the ground surface can be detected also inside the circular line.

DETAILED DESCRIPTION

<Sampling System>

Figure 1:
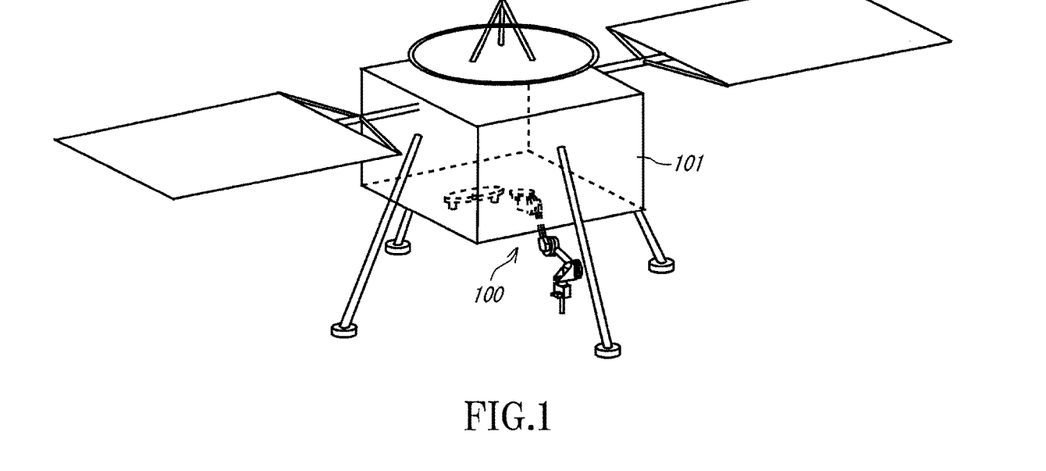
FIG. 1 shows a sampling system mounted to a work machine.

Hereinafter, an embodiment of the present application is described with reference to the drawings. First, an overall configuration of a sampling system 100 is described. FIG. 1 shows the sampling system 100, which is mounted to a work machine 101. The sampling system 100 according to the present embodiment is provided on the bottom surface of the work machine 101. The work machine 101 of the present embodiment is a landing probe that lands on a ground surface and then performs probing. Alternatively, the work machine 101 may be a different type of exploration probe such as an exploration rover, or may be, for example, a robot that performs work different from probing.

Figure 2:
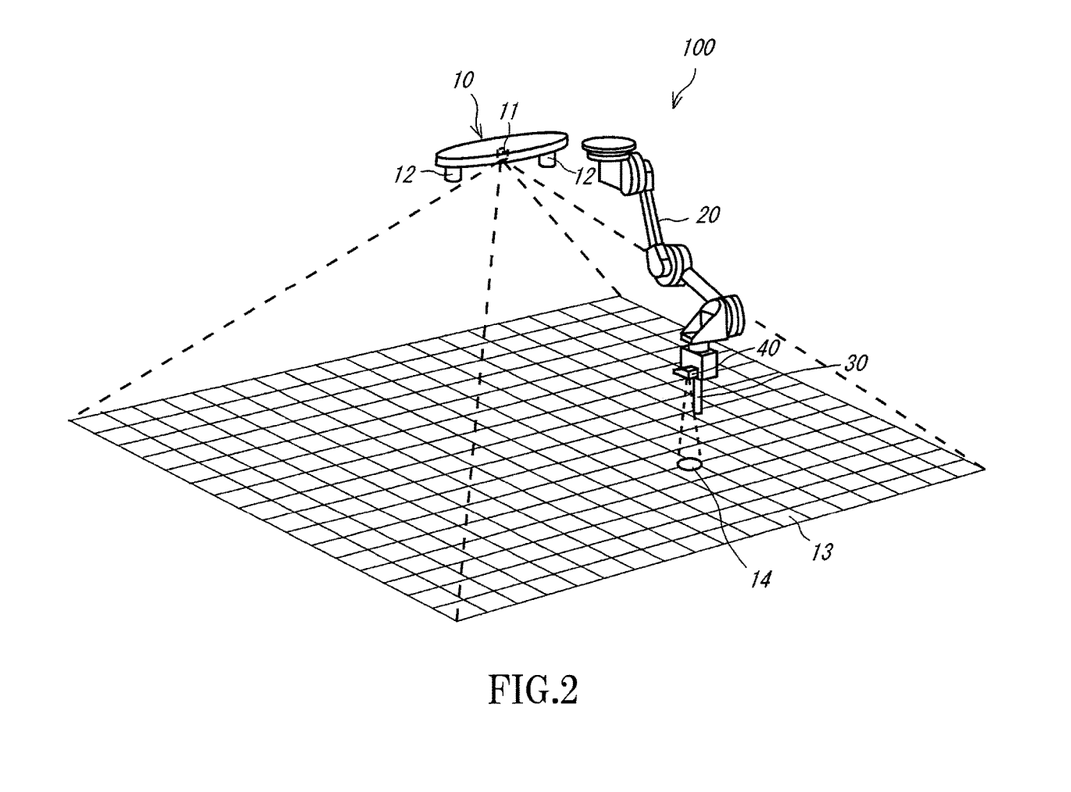
FIG. 2 is an overall view of the sampling system.
Figure 3:
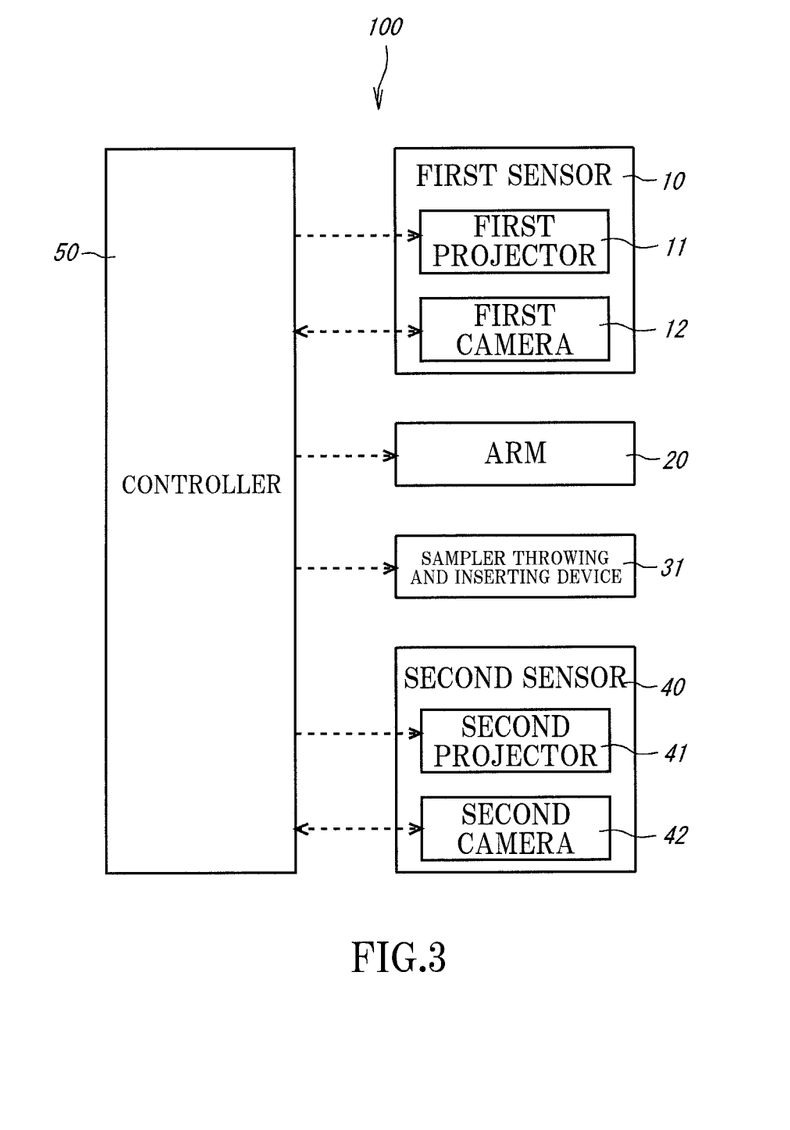
FIG. 3 is a block diagram of a control system of the sampling system.

FIG. 2 is an overall view of the sampling system 100, and FIG. 3 is a block diagram of a control system of the sampling system 100. As shown in FIG. 2 and FIG. 3, the sampling system 100 includes a first sensor 10, an arm 20, a sampler 30, a second sensor 40, and a controller 50. Hereinafter, these components are described sequentially.

The first sensor 10 is a sensor provided on the work machine 101. The first sensor 10 of the present embodiment includes a first projector 11 and a first camera 12. The first projector 11 projects a net-like grating. The first camera 12 captures an image of the grating that is displayed by projection. It should be noted that the first camera 12 is a stereoscopic camera. As shown in FIG. 3, the first sensor 10 is electrically connected to the controller 50. Image data of the grating captured by the first camera 12 is transmitted to the controller 50.

The arm 20 is a robotic arm, and its proximal end portion is provided on the work machine 101. The distal end portion of the arm 20 is provided with the sampler 30 and the second sensor 40. The arm 20 is electrically connected to the controller 50. The controller 50 is capable of driving the arm 20 arbitrarily by transmitting control signals to the arm 20.

Figure 4:
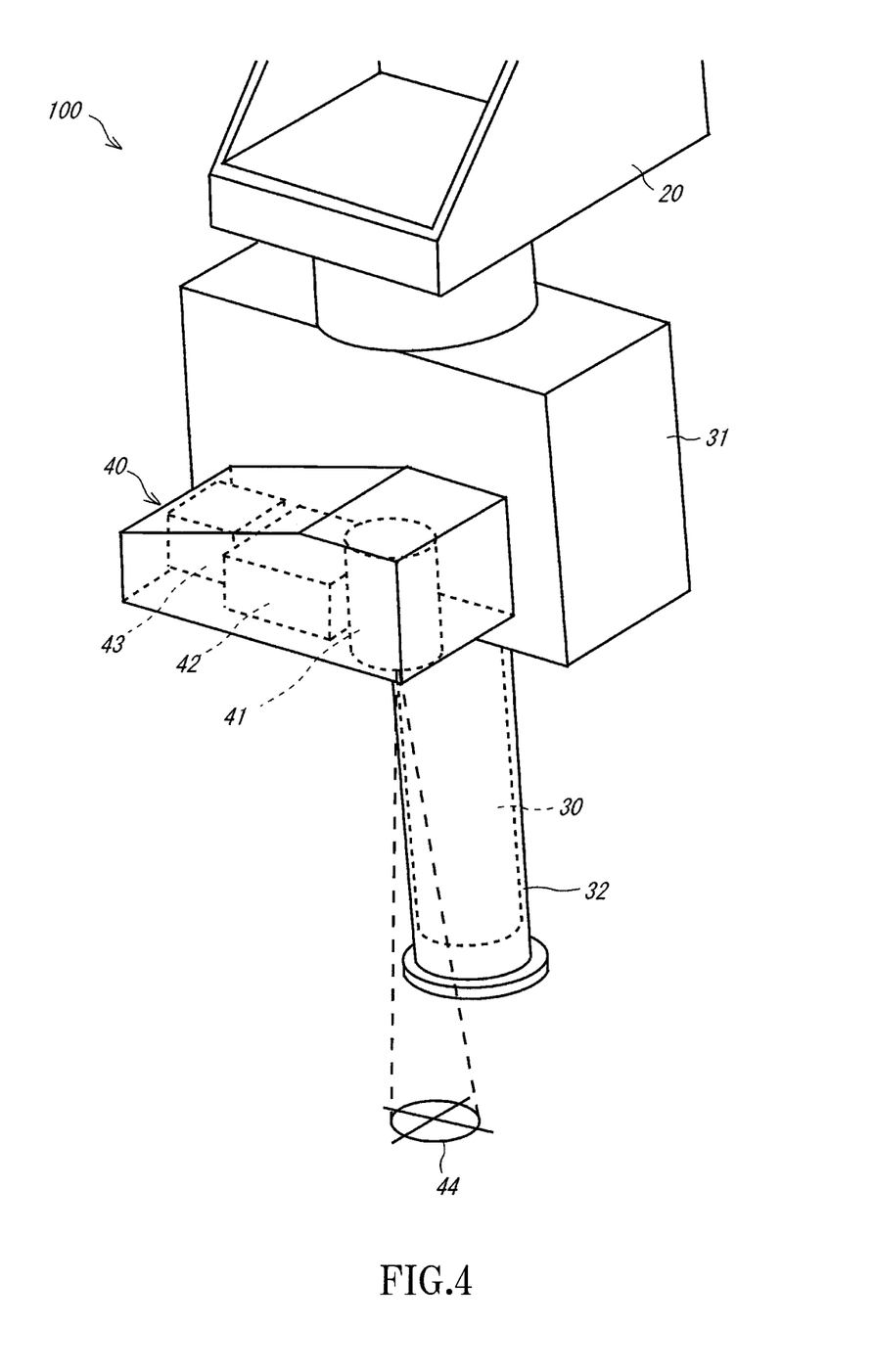
FIG. 4 is an enlarged view of the vicinity of the distal end portion of an arm.

The sampler 30 is a piece of equipment configured to sample sand or the like on the ground surface (i.e., a piece of equipment for bringing back a sample of the ground surface). FIG. 4 is an enlarged view of the vicinity of the distal end portion of the arm 20. As shown in FIG. 4, the sampling system 100 of the present embodiment includes an external cylinder member 32. The sampler 30 is accommodated inside the external cylinder member 32. The sampler 30 has a cylindrical shape. The sampler 30 is thrown against, and thereby inserted into, the ground surface by a sampler throwing and inserting device 31. After the sampler 30 is thrown and inserted into the ground surface, the sampler 30 is pulled out of the ground surface, and thereby the sand or the like in the sampler 30 can be collected.

The second sensor 40 is a sensor provided on the distal end portion of the arm 20. The second sensor 40 includes: a second projector 41 configured to project a reference mark 44 (see FIG. 5), which will be described below; a second camera 42 configured to capture an image of the reference mark 44, which is displayed by projection; and an illuminator 43 configured to emit light in a direction in which the reference mark 44 is projected. The second camera 42 is a stereoscopic camera. The second sensor 40 is electrically connected to the controller 50. Image data of the reference mark 44 captured by the second camera 42 is transmitted to the controller 50.

It should be noted that when the distance from the second projector 41 to its detection target is long, the size of the reference mark 44 displayed on the detection target by projection is large, whereas when the distance from the second projector 41 to the detection target is short, the size of the reference mark 44 displayed on the detection target by projection is small. The second sensor 40 has a higher detection precision than the first sensor 10. The reason for this is as follows: the image-capturing range of the second camera 42 is narrower than the image-capturing range of the first camera 12; therefore, in the image-capturing range of the second camera 42, the number of pixels of the second camera 42 is greater than the number of pixels of the first camera 12.

Figure 5A:
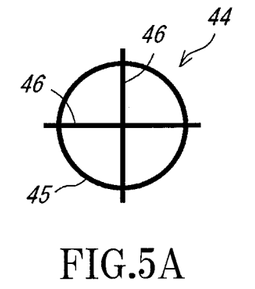
FIGS. 5A to 5F show examples of a reference mark.
Figure 5B:
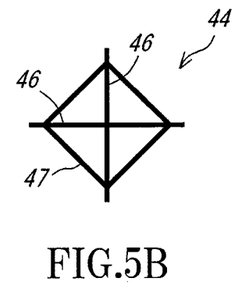
Figure 5C:
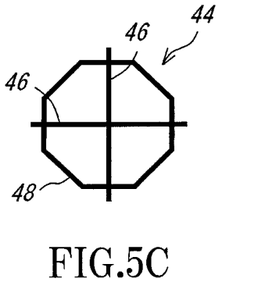
Figure 5D:
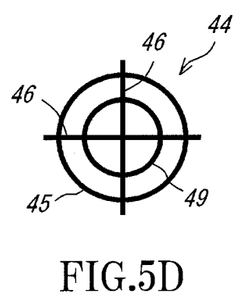
Figure 5E:
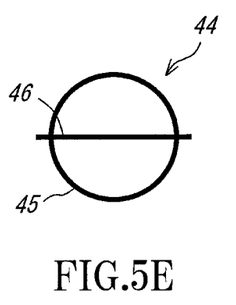
Figure 5F:
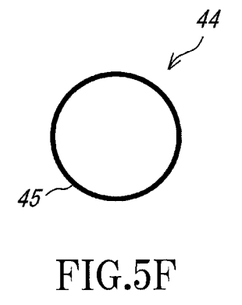

FIGS. 5A to 5F show examples of the aforementioned reference mark 44. The present embodiment adopts the reference mark 44 shown in FIG. 5A. Specifically, the reference mark 44 of the present embodiment comprises a circular line 45 and two straight lines 46. Each straight line 46 passes through the center of the circular line 45, and both end portions of each straight line 46 cross the circular line 45. Alternatively, the reference mark 44 may include a rectangular line 47 as shown in FIG. 5B instead of the circular line 45. Further alternatively, the reference mark 44 may include a polygonal line 48 as shown in FIG. 5C. Still further alternatively, inside the circular line 45, the reference mark 44 may include a smaller-diameter circular line 49, which has a diameter less than the diameter of the circular line 45, as shown in FIG. 5D. Still further alternatively, the reference mark 44 may be constituted by the circular line 45 and one straight line 46 as shown in FIG. 5E. Still further alternatively, the reference mark 44 may be constituted only by the circular line 45 as shown in FIG. 5F.

The controller 50 is a device configured to control various pieces of equipment. The controller 50 includes a processor, a volatile memory, a nonvolatile memory, an I/O interface, etc. As shown in FIG. 3, the controller 50 is electrically connected to the first sensor 10 and the second sensor 40. The controller 50 is capable of obtaining image data transmitted from the first sensor 10 and the second sensor 40 and performing arbitrary control by transmitting control signals to the first sensor 10 and the second sensor 40. The controller 50 is electrically connected also to the arm 20 and the sampler throwing and inserting device 31. The controller 50 is capable of performing arbitrary control by transmitting control signals to the arm 20 and the sampler throwing and inserting device 31.

<Sampling Method>

Figure 6:
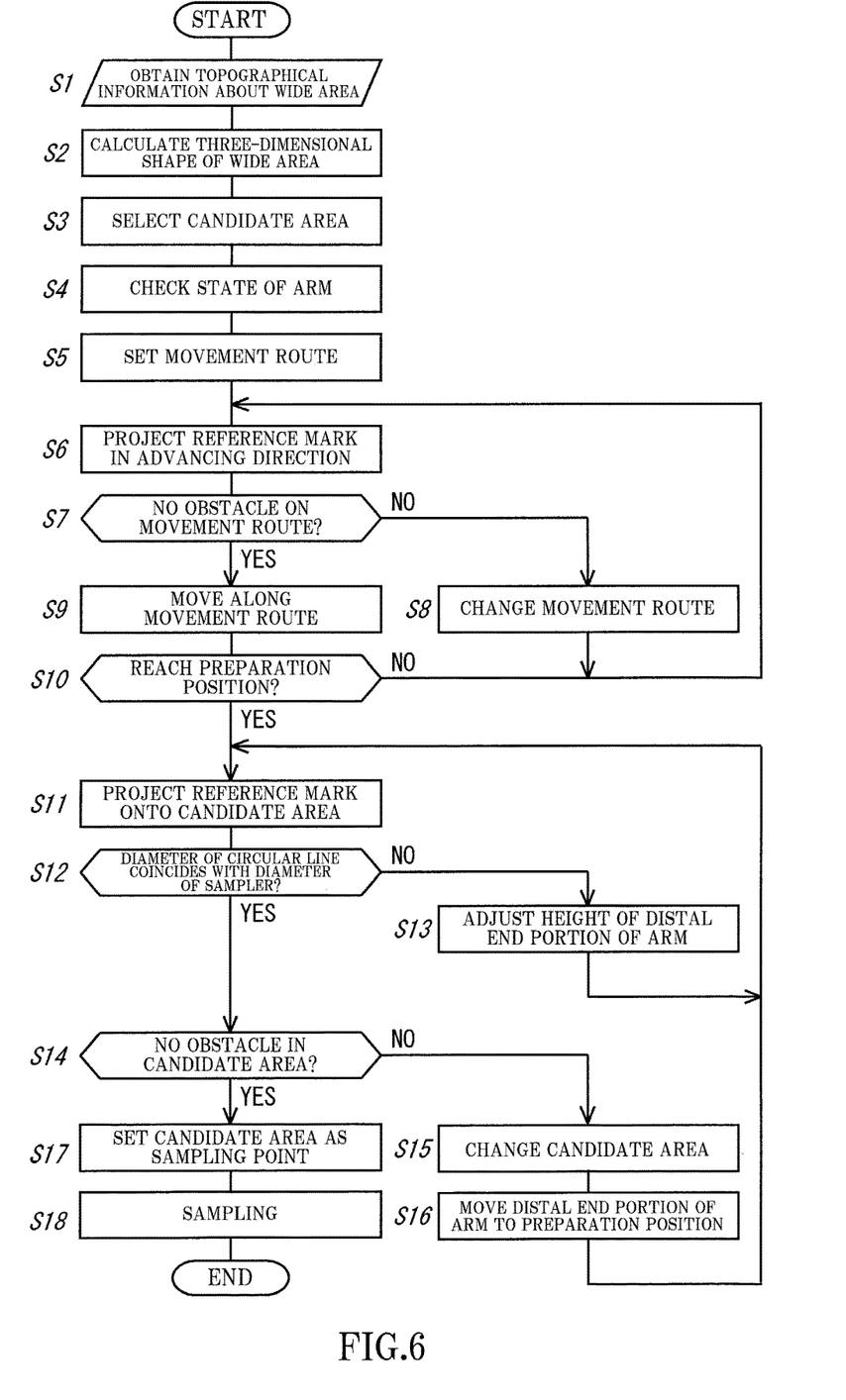
FIG. 6 is a flowchart of control according to a sampling method.

Next, a sampling method according to the present embodiment is described. FIG. 6 is a flowchart of control according to the sampling method of the present embodiment. The control shown in FIG. 6 is performed by the controller 50. In the present embodiment, it is assumed that sampling is performed on a ground surface where large and small obstacles exist sparsely. It should be noted that the term "obstacle" is defined herein to include not only rocks and stones, but also anything formed by unevenness of the ground surface.

First, as shown in FIG. 6, when the control starts, the controller 50 obtains topographical information about a wide area 13 on the ground surface from the first sensor 10 (step S1). Specifically, the controller 50 causes the first projector 11 provided on the work machine 101 to project a net-like grating onto the wide area 13 on the ground surface, causes the first camera 12 to capture an image of the grating that is displayed on the wide area 13 by projection, and obtains image data of the grating captured by the first camera 12. That is, the topographical information in step S1 is the image data of the grating.

Next, based on the topographical information about the wide area 13 (the image data) obtained in step S1, the controller 50 calculates a three-dimensional shape of the wide area 13 (step S2). The three-dimensional shape of the wide area 13 can be calculated by a known grating projection technique. Specifically, the image of the grating is binarized by using the image data, and thereby the grating is recognized. Then, the coordinates of a portion onto which the grating is projected are calculated based on the degree of distortion of the grating. It should be noted that the three-dimensional shape of the wide area 13 may be calculated not by the controller 50, but by the first sensor 10. In this case, the controller 50 obtains, from the first sensor 10, the three-dimensional shape data of the wide area 13 as the topographical information about the wide area 13.

Next, the controller 50 selects a candidate area 14 within the wide area 13 based on the three-dimensional shape of the wide area 13 (step S3). It should be noted that the candidate area 14 has an area less than the area of the wide area 13. In the present embodiment, a flat area with no obstacles is selected as the candidate area 14. However, since the detection precision of the first sensor 10 of the present embodiment is not high, it is possible that small obstacles exist in the candidate area 14 selected in step S3.

Next, the controller 50 checks the state of the arm 20 (step S4). Specifically, the controller 50 causes the first camera 12 to capture an image of the arm 20, and confirms that there is no abnormality, such as damage, on the arm 20 as well as checks the position of the distal end portion of the arm 20. It should be noted that, hereinafter, the position of the distal end portion of the arm 20 at the time is referred to as "standby position".

Next, the controller 50 sets a movement route based on the three-dimensional shape of the wide area 13 (step S5). The movement route is a route for the arm 20 to move from the "standby position" to a "preparation position" that faces the candidate area 14. For example, if it can be confirmed that there is no obstacle between the standby position and the preparation position based on the three-dimensional shape of the wide area 13, a route that is obtained by linearly connecting between the standby position and the preparation position is set as the movement route. On the other hand, if it is found that there is an obstacle between the standby position and the preparation position, a route that detours around the obstacle is set as the movement route. That is, the movement route is a route that allows the distal end portion of the arm 20 to move from the standby position to the preparation position without coming into contact with the obstacle. It should be noted that the preparation position in the present embodiment is located vertically above the candidate area 14. However, for example, if the movable range of the arm 20 is limited, the preparation position need not be located vertically above the candidate area 14.

Next, before moving the distal end portion of the arm 20, the controller 50 causes the second projector 41 provided on the distal end portion of the arm 20 to project the reference mark 44 in the advancing direction of the distal end portion of the arm 20 (step S6). For example, assume that the distal end portion of the arm 20 is at the standby position, and the movement route is a route that linearly connects between the standby position and the preparation position. In this case, the second projector 41 projects the reference mark 44 toward the preparation position.

Subsequently, the controller 50 determines whether or not there is no obstacle on the movement route (step S7). The controller 50 causes the second camera 42 to capture an image of the reference mark 44 projected by the second projector 41, thereby obtaining image data. If the reference mark 44 cannot be recognized as a result of analyzing the image data, or if the size of the recognized reference mark 44 is greater than or equal to a particular value, i.e., the distance to an obstacle on which the reference mark 44 is displayed by projection is far, then it can be determined that there is no obstacle on the movement route. On the other hand, if the size of the reference mark 44 is less than the particular value, it can be determined that there is an obstacle on the movement route.

If it is determined in step S7 that there is an obstacle on the movement route (NO in step S7), the controller 50 changes the advancing direction of the distal end portion of the arm 20, thereby changing the movement route (step S8). Thereafter, the flow returns to step S6. On the other hand, if it is determined in step S7 that there is no obstacle on the movement route (YES in step S7), the controller 50 moves the distal end portion of the arm 20 along the movement route (step S9).

Then, the controller 50 determines whether or not the distal end portion of the arm 20 has reached the preparation position (step S10). If it is determined that the distal end portion of the arm 20 has not yet reached the preparation position (NO in step S10), the flow returns to step S6. On the other hand, if it is determined that the distal end portion of the arm 20 has reached the preparation position (YES in step S10), the flow proceeds to step S11. That is, until the distal end portion of the arm 20 reaches the preparation position, the controller 50 moves the distal end portion of the arm 20 while repeatedly performing steps S6 to S10.

In the present embodiment, the movement route is set in step S5 so as to allow the distal end portion of the arm 20 to move to the preparation position without coming into contact with any obstacles. In addition, in steps S6 to S10, it is further determined whether or not there is an obstacle on the movement route. In a case where there is an obstacle on the movement route, the distal end portion of the arm 20 is moved in a manner to avoid the obstacle. Thus, in the present embodiment, double preventative measures are taken so that the distal end portion of the arm 20 will not come into contact with any obstacles. This makes it possible to assuredly prevent the distal end portion of the arm 20, which is provided with the sampler 30 and the second sensor 40, from coming into contact with any obstacles.

Next, the controller 50 causes the second projector 41 to project the reference mark 44 onto the candidate area 14 selected in step S3 (step S11). Then, the controller 50 determines whether or not the diameter of the circular line 45 included in the reference mark 44 displayed on the candidate area 14 by projection coincides with the diameter of the sampler 30 (step S12). The controller 50 obtains, by the second camera 42, the image data of the reference mark 44 displayed on the candidate area 14 by projection, and performs the determination based on the obtained image data.

If it is determined in step S12 that the diameter of the circular line 45 displayed on the candidate area 14 by projection does not coincide with the diameter of the sampler 30 (NO in step S12), the controller 50 moves the arm 20 such that the diameter of the circular line 45 displayed on the candidate area 14 by projection coincides with the diameter of the sampler 30, thereby adjusting the vertical position of the distal end portion of the arm 20 (step S13). Specifically, if the diameter of the circular line 45 displayed on the candidate area 14 by projection is less than the diameter of the sampler 30, the controller 50 moves the distal end portion of the arm 20 upward. On the other hand, if the diameter of the circular line 45 displayed on the candidate area 14 by projection is greater than the diameter of the sampler 30, the controller 50 moves the distal end portion of the arm 20 downward. After the vertical position of the distal end portion of the arm 20 is adjusted, the flow returns to step S11.

On the other hand, if the controller 50 determines in step S12 that the diameter of the circular line 45 displayed on the candidate area 14 by projection coincides with the diameter of the sampler 30 (NO in step S12), the flow proceeds to step S14.

In step S14, it is determined whether or not there is no obstacle in the candidate area 14. For example, based on the image data of the reference mark 44 captured by the second camera 42, the controller 50 performs binarization of the image, thereby recognizing the reference mark 44. If the amount of distortion of the recognized reference mark 44 is greater than or equal to a particular value, it can be determined that there is an obstacle in the candidate area 14. On the other hand, if the amount of distortion of the reference mark 44 is less than the particular value, it can be determined that there is no obstacle in the candidate area 14.

If the controller 50 determines in step S14 that there is an obstacle in the candidate area 14 (NO in step S14), the controller 50 changes the candidate area 14 (step S15). In the present embodiment, an area adjacent to the current candidate area 14 is set as a new candidate area 14. Alternatively, the flow may return to step S3, in which the candidate area 14 is selected again. After the candidate area 14 is changed, the controller 50 moves the distal end portion of the arm 20 to a new preparation position that is located vertically above the changed candidate area 14 (step S16). After the distal end portion of the arm 20 is moved to the preparation position, the flow returns to step S11.

On the other hand, if it is determined in step S14 that there is no obstacle in the candidate area 14 (YES in step S14), the controller 50 sets the candidate area 14 as a sampling point (step S17). Then, the controller 50 performs sampling at the sampling point (step S18). The sampling is performed in the following manner. The sampler 30 is thrown and inserted into the sampling point by the sampler throwing and inserting device 31, such that the sampler 30 is embedded into the ground surface to a particular depth. Thereafter, the sampler 30, which contains the sand or the like of the ground surface, is collected by pulling out the sampler 30 from the ground surface, and thus the sampling is completed.

<Advantages Effects>

The sampling system 100 and the sampling method according to the present embodiment are as described above. In the sampling method according to the present embodiment, the topographical information about the wide area 13, which is obtained by using the first sensor 10, is used merely for selecting the candidate area 14. Therefore, the first sensor 10 is not required to have a high detection precision. For this reason, the detection by the first sensor 10 can be performed speedily. Moreover, the topographical information obtained by using the second sensor 40 is information about the candidate area 14, whose area is small. For this reason, the detection by the second sensor 40 can be performed speedily. Thus, the sampling method according to the present embodiment makes it possible to specify the sampling point speedily, consequently making it possible to perform the sampling speedily. In addition, in the above sampling method, the movement route, which does not cause the distal end portion of the arm to come into contact with the obstacle, is set based on the topographical information about the wide area, and the distal end portion of the arm is moved along the movement route. Therefore, the distal end portion of the arm can be prevented from coming into contact with the obstacle, and pieces of equipment provided on the distal end portion of the arm can be prevented from getting damaged.

In the above sampling method, the second sensor may include a projector configured to project a predetermined reference mark, and obtaining the topographical information about the candidate area may include: projecting the reference mark onto the candidate area; and obtaining the topographical information about the candidate area based on a shape of the reference mark that is displayed on the candidate area by projection.

According to this method, the topographical information about the candidate area can be obtained speedily and accurately with a simple configuration.

The above sampling method may include projecting the reference mark from the projector in an advancing direction of the distal end portion of the arm when moving the distal end portion of the arm to the preparation position, determining whether or not there is an obstacle on the movement route based on presence or absence of a display of the reference mark by projection or based on a shape and a size of the reference mark displayed by projection, and if it is determined that there is an obstacle on the movement route, moving the distal end portion of the arm to the preparation position in a manner to avoid the obstacle.

According to this method, even if there is an obstacle on the movement route, the distal end portion of the arm is moved in a manner to avoid the obstacle. This makes it possible to more assuredly prevent damage to the pieces of equipment provided on the distal end portion of the arm.

Further, according to the sampling system 100 of the present embodiment, the circular line 45, the shape of which is the same as the cross-sectional shape of the sampler 30, is projected onto the ground surface, and the diameter of the circular line 45 displayed on the ground surface by projection is made coincide with the diameter of the sampler 30. Then, the sampling point is specified by utilizing the circular line 45 displayed on the ground surface by projection. In this manner, the sampling point can be specified by the detection that covers only the range corresponding to the shape and the size of the sampler 30. This makes it possible to efficiently specify the sampling point. Consequently, the sampling can be performed speedily.

Here, when measuring the diameter of the circular line, there is a case where it is not clear which two points on the circular line should be used to measure an inter-point distance therebetween to obtain the diameter of the circular line. In this respect, in the above configuration, the diameter of the circular line can be obtained by measuring the distance between the intersection points of the straight line and the circular line. Therefore, the diameter of the circular line can be accurately and readily obtained. Moreover, since the straight line passes through the inside of the circular line, irregularities of the ground surface can be detected also inside the circular line. Therefore, detection precision can be improved by the above configuration.

In the above sampling system, the reference mark may include a smaller-diameter circular line inside the circular line, the smaller-diameter circular line having a diameter less than the diameter of the circular line.

According to this configuration, since the smaller-diameter circular line is positioned inside the circular line, irregularities of the ground surface can be detected also inside the circular line. Therefore, detection precision can be improved by the above configuration.

The sampling method according to the present embodiment is realized by the control performed by the controller 50. Alternatively, part of the control may be performed by an operator. For example, the selection of the candidate area 14 may be performed by an operator. Further, in the present embodiment, in step S3, only one candidate area 14 is selected. Alternatively, a plurality of candidate areas 14 may be selected.

The above description of the sampling method according to the present embodiment gives an example case in which the second projector 41 projects the reference mark 44. Alternatively, the second projector 41 may project a net-like grating. In this case, the three-dimensional shape of the candidate area 14 may be calculated by grating projection technique, and based on the calculated three-dimensional shape, the sampling point may be set.

Figure 7:
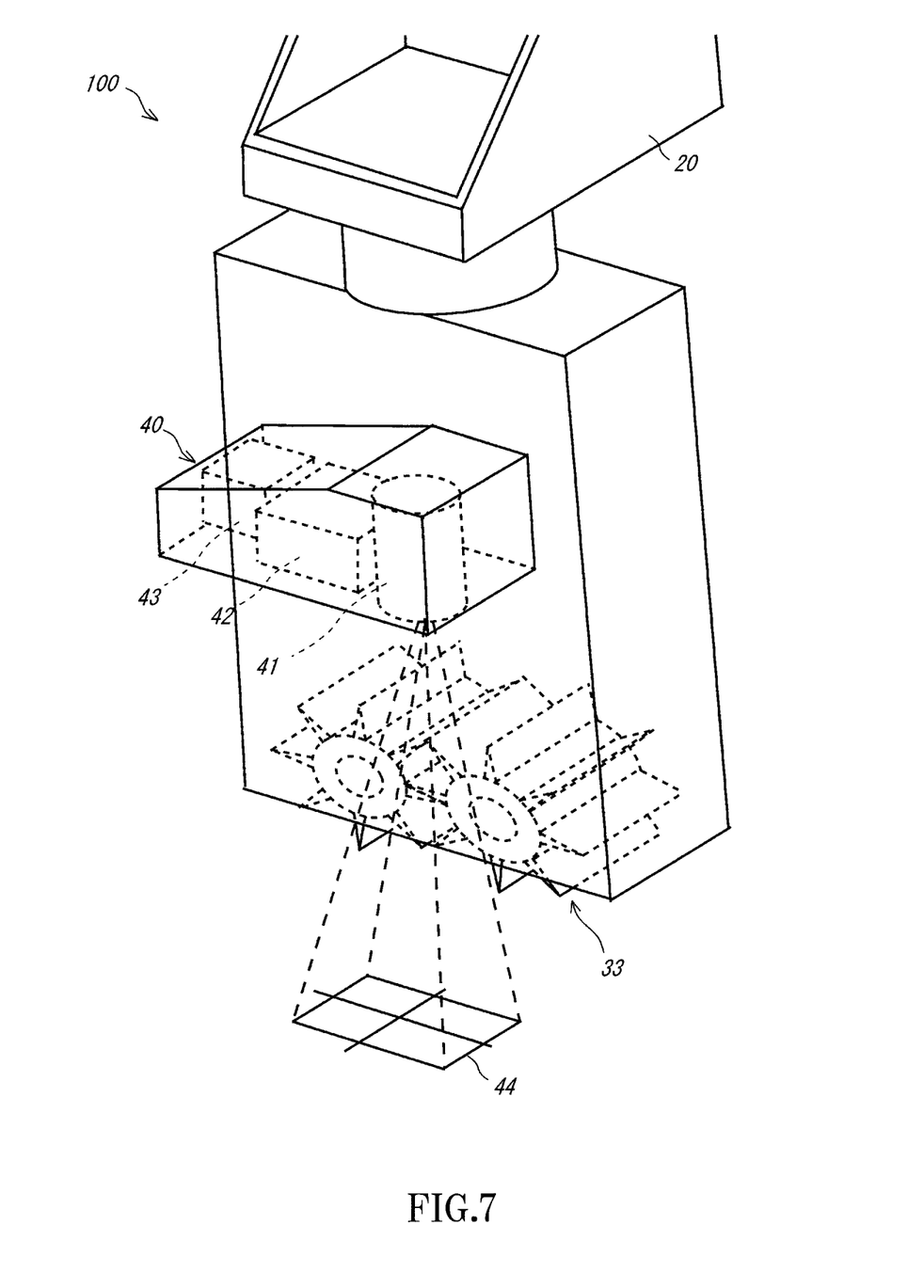
FIG. 7 is an enlarged view of the vicinity of the distal end portion of the arm according to a variation.

Although sand or the like is collected by using the cylindrical sampler 30 in the present embodiment, the sampling is not thus limited. For example, as shown in FIG. 7, the sampling may be performed by using a gear type sampler 33. In this case, desirably, the reference mark 44 has a shape corresponding to a sampling region on which the sampler 33 performs the sampling. Alternatively, the distal end of the arm 20 may be provided with a hand that is configured to hold a sampling target in a sandwiching manner, and sand or the like may be collected by using the hand. Further alternatively, the sampling may be performed by using a scoop or brush.

The invention claimed is:

1. A sampling system comprising:
   a sampler for bringing back a sample of a ground surface;
   a projector configured to project a reference mark onto the ground surface, the reference mark including a line that has a predetermined shape;
   a camera configured to capture an image of the reference mark that is displayed on the ground surface by projection;
   an arm whose distal end portion is provided with the sampler, the projector, and the camera; and
   a controller configured to:
   obtain a size of the line that is displayed on the ground surface by projection, based on image data of the reference mark captured by the camera;
   adjust a height position of the projector based on the obtained size of the line; and thereafter
   specify a sampling point, into which the sampler is thrown and inserted, based on the image data of the reference mark captured by the camera.

2. The sampling system according to claim 1, wherein the sampler has a cylindrical shape,
   the reference mark includes a circular line, and
   the controller is configured to:
   obtain a diameter of the circular line that is displayed on the ground surface by projection, based on the image data of the reference mark captured by the camera;
   adjust a height position of the projector by driving the arm, such that the obtained diameter of the circular line coincides with a diameter of the sampler; and thereafter
   specify the sampling point, into which the sampler is thrown and inserted, based on the image data of the reference mark captured by the camera.

3. The sampling system according to claim 2, wherein the reference mark includes one or two straight lines passing through a center of the circular line, each straight line having both end portions crossing the circular line.

4. The sampling system according to claim 2, wherein the reference mark includes a smaller-diameter circular line inside the circular line, the smaller-diameter circular line having a diameter less than the diameter of the circular line.

5. The sampling system according to claim 3, wherein the reference mark includes a smaller-diameter circular line inside the circular line, the smaller-diameter circular line having a diameter less than the diameter of the circular line.

* * * * *